United States Patent
Kwon et al.

(10) Patent No.: US 7,814,083 B2
(45) Date of Patent: Oct. 12, 2010

(54) METHOD AND SYSTEM FOR SUPPORTING INFORMATION ACCESS AND RECORD MEDIA THEREFOR

(75) Inventors: Soon-Ho Kwon, Seoul (KR); Kyung-Ran Lee, Seoul (KR); Hyung-Rae Kim, Anyang-si (KR); Chan-Ho Yun, Seoul (KR); Won-Min Oh, Seoul (KR); Joon-Kee Chang, Yongin-si (KR)

(73) Assignee: NHN Corporation, Seongnam-si (KR)

( * ) Notice: Subject to any disclaimer, the term of this patent is extended or adjusted under 35 U.S.C. 154(b) by 216 days.

(21) Appl. No.: 11/638,205

(22) Filed: Dec. 13, 2006

(65) Prior Publication Data

US 2007/0162562 A1 Jul. 12, 2007

(30) Foreign Application Priority Data

Dec. 13, 2005 (KR) .................... 10-2005-0122480

(51) Int. Cl.
 *G07F 17/30* (2006.01)
(52) U.S. Cl. .................... 707/705; 707/706; 707/707; 707/709
(58) Field of Classification Search .................... 707/3, 707/10, 999.99, 705, 706, 717, 709
See application file for complete search history.

(56) References Cited

U.S. PATENT DOCUMENTS

| 2007/0060114 A1* | 3/2007 | Ramer et al. ................. 455/418 |
| 2007/0073719 A1* | 3/2007 | Ramer et al. .................. 707/10 |
| 2007/0094042 A1* | 4/2007 | Ramer et al. .................... 705/1 |
| 2007/0100653 A1* | 5/2007 | Ramer et al. .................. 705/1 |
| 2007/0100805 A1* | 5/2007 | Ramer et al. .................... 707/3 |
| 2007/0100806 A1* | 5/2007 | Ramer et al. .................... 707/3 |

* cited by examiner

*Primary Examiner*—Jean M Corrielus
(74) *Attorney, Agent, or Firm*—H.C. Park & Associates, PLC (57) ABSTRACT

Method and system for supporting access to information and a recording medium are provided. The method of supporting access to information in a system connected to a user client through a network includes: (a) receiving an access application download request from the user client; (b) transmitting the requested access application to the user client, the access application serving to replace a first address bar existing in a web browser with a second address bar; (c) receiving keyword information among information input to the second address bar by a user, the keyword information being text information not directly including access information; and (d) transmitting at least one of address information corresponding to the keyword information and search result information on the keyword information to the user client. Accordingly, all the kinds of information can be accessed using an address bar, thereby giving convenience to a user.

30 Claims, 9 Drawing Sheets

METHOD AND SYSTEM FOR SUPPORTING INFORMATION ACCESS AND RECORD MEDIA THEREFOR

BACKGROUND

1. Field

The present invention relates to method and system for supporting access to information and a recording medium therefor, and more particularly, to method and system for supporting access to information, which can allow a user to easily and rapidly access desired information, and a recording medium therefor.

2. Background Art

Thanks to wide spread of Internet and computers and enhancement in data processing rate, many users could access desired information through Internet without any spatial and temporal restriction.

The development of web browsers such as Microsoft Internet Explorer and Netscape Communicator facilitated the access to information through Internet and thus users could easily access desired information by inputting a URL (Uniform Resource Location) to an address bar located in a predetermined area of the web browsers.

In order to input the URL, the users mainly use a domain name rather than IP addresses. In the past, the web browsers could process only English domain names. Accordingly, a user should memorize in advance and input the English domain name of a specific web site to an address bar.

This method is inconvenient to the users in that the users should memorize long English letters. In recent years, services were provided which permit the access to the corresponding web site even by inputting Korean domain names.

These days, a variety of portal sites provide competitively search toolbars so as to allow the users to easily use the search services provided by the portal sites and to rapidly confirm the search results of the portal sites.

The search toolbars are services of providing a particular information search bar in a predetermined area of the activated web browsers in addition to the address bar and automatically providing the search result of the corresponding portal site regardless of the currently accessed web site when a user inputs a keyword to the information search bar.

Such a variety of services facilitating the access to information through Internet are still inconvenient to the users, because the address bar and the information search bar independently exist in the web browsers and information to be input to the bars is different from each other.

In the past, when a user inputs a specific keyword to an address bar and the keyword is not a Korean domain, the keyword is an erroneous URL and thus does not provide appropriate information.

On the contrary, even when a keyword registered as a Korean domain is input to an information search bar, the corresponding web site is not accessed directly, but only the search result including the Korean domain name is provided. Accordingly, the user should check the search result again and then access a desired web site.

Similarly, when a user intends to search for information stored in a computer, the user could use only the address bar of the web browsers, but could not check the information stored in the computer using the information search bar.

On the other hand, the past information search bar provided information on all the web documents including the keyword input by the user. Accordingly, it takes much time for the user to search for the desired information using the search result.

SUMMARY

The present invention is contrived to solve the above-mentioned problems. An advantage of some aspects of the invention is to provide method and system for supporting access to information, which can allow a user to easily obtain all the desired information by the use of a web browser, and a recording medium therefor.

Another advantage of some aspects of the invention is to provide method and system for supporting access to information, which can allow a user to carry out a variety of requests such as access to a web site corresponding to a URL and a keyword search by the use of a convenient interface, and a recording medium therefor.

Another advantage of some aspects of the invention is to provide method and system for supporting access to information, which can allow a user to easily input a desired keyword and to easily access information, and a recording medium therefor.

Another advantage of some aspects of the invention is to provide method and system for supporting access to information, which can efficiently provide a search result corresponding to a keyword input by a user.

According to an aspect of the invention, there is provided a method of supporting access to information in a system connected to a user client through a network, the method including: (a) receiving an access application download request from the user client; (b) transmitting the requested access application to the user client, the access application serving to replace a first address bar existing in a web browser installed in the user client with a second address bar; (c) receiving keyword information among information input to the second address bar by a user, the keyword information being text information not directly including access information; and (d) transmitting at least one of address information corresponding to the keyword information and search result information on the keyword information to the user client.

The access application may change a view-address status value in a registry of the web browser when it is installed in the user client.

The access application may judge whether the information input to the second address bar by the user is at least one of a URL, an IP address, a file path, a Java script, and keyword information.

The method may further include: receiving syllable information on the keyword information input by the user; and extracting recommended keyword information including the syllable information and transmitting the recommended keyword information to the user client. Here, the access application may output a previous input information history of the user to the second address bar when the user does not set the reception of the recommended keyword information.

The method may further include judging whether an IP address corresponding to the keyword information exists with reference to a keyword mapping table storing an URL corresponding to the keyword. Here, in (d), a search result corresponding to the keyword information may be extracted and provided when the IP address does not exist.

The method may further include judging whether an IP address corresponding to the keyword information exists with reference to a keyword mapping table storing a URL corresponding to the keyword. Here, in (d), the user client may be redirected to the IP address when the IP address does not exist.

When search domain designating information on the keyword is received from the user client, a search result corresponding to the search domain may be provided in (d).

According to another aspect of the invention, there is provided a recording medium in which a program of commands to be executed by a digital processor is materially embodied so as to support access to information and which can be read by the digital processor, the recording medium including a program performing: (a) changing a view-address status value of a web browser in a registry and replacing a first address bar of the web browser with a second address bar when the program is installed in a user client; (b) analyzing information input to the second address bar; (c) transmitting keyword information among the input information to a web server; and (d) receiving at least one of an IP address corresponding to the keyword information and search result information corresponding to the keyword information from the web server.

According to another aspect of the invention, there is provided a system for supporting access to information, the system including: a web server which is connected to a user client through a network, which receives an access application download request from the user client, which transmits the requested access application to the user client, the access application serving to replace a first address bar existing in a web browser installed in the user client with a second address bar, which receives keyword information among information input to the second address bar by a user, and which transmits at least one of address information corresponding to the keyword information and search result information on the keyword information to the user client; a search server collecting search information on a keyword; and a database storing a keyword mapping table for redirecting the user client to the IP address and search result information corresponding to the keyword.

According still another aspect of the invention, a method of supporting access to information in a server connected to a local computer is provided. The method comprises: receiving text in an address bar from a user; determining by the local computer whether the text is URL or not; if the text is an URL opening the requested URL; and if the text is not an URL send the text as a keyword to the server for searching.

The method may further comprise installing an address bar software downloaded from the server. The address bar in the act of receiving text may be created by the address bar software. The method may further comprise displaying the requested URL.

DESCRIPTION OF EXEMPLARY EMBODIMENTS

Hereinafter, method and system for supporting access to information and a recording medium therefor according to exemplary embodiments of the invention will be described in detail with reference to the attached drawings.

Figure 1:
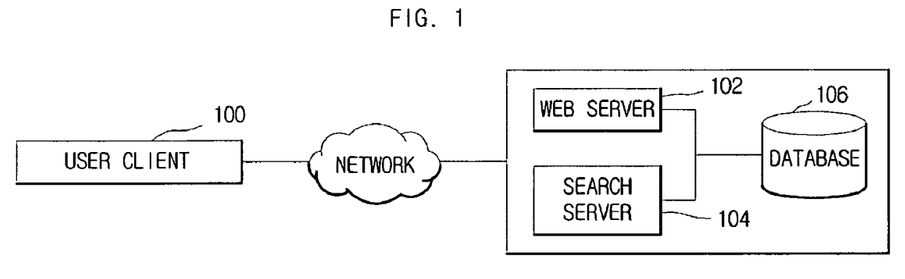
FIG. 1 is a diagram illustrating a configuration of a system for supporting access to information according to an exemplary embodiment of the invention.

FIG. 1 is a diagram illustrating a configuration of a system for supporting access to information according to an embodiment of the invention.

As shown in FIG. 1, the system for supporting access to information according to an embodiment of the invention includes a web server 102, a search server 104, and a database 106 and can be connected to a user client 100 through a network.

Here, the network may include both of a wired network such as an exclusive line and a wireless network such as wireless Internet, a mobile communication network, and a satellite communication network.

The user client 100 is a terminal which can be connected to the network and in which an application for supporting access to information, and examples thereof include a desktop PC, a notebook computer, a PDA, and a mobile communication terminal.

According to an exemplary embodiment of the invention, the web server 102 provides the user client 100 with an application for supporting access to information.

An access application is downloaded by and installed in the user client 100 on a user's request and replaces an address bar of a web browser with a bar according to an embodiment of the invention.

In the following description, the original address bar is referred to as a first address bar and the address bar replaced by the access application is referred to as a second address bar.

In the past, an information search bar was provided independent of the first address bar of the web browser at the time of installing a search toolbar. However, in an embodiment of the invention, only one address bar for inputting an address or a keyword exists in the web browser because the address bar is replaced with the second address bar.

The access application provides a user with a convenient interface for accessing information by replacing the first address bar with the second address bar.

The user can input one of a URL, an IP address, a Java script, a file path, and a keyword including text to the second address bar (not limited to it). The access application analyzes the information input by the user and processes necessary operations.

Here, the keyword means text information not including a direct access address such as the URL and the file path.

For example, when the information input to the second address bar is the URL or IP address, the access application can allow the user client 100 to access a node having the corresponding URL or IP address through the network. When the input information is the file path, the access application searches for and outputs a file corresponding to the file path from the user client 100.

When the input information is the keyword including text, the access application transmits the keyword information to the web server 102.

The database 106 stores a mapping table in which keywords are mapped with URLs. When receiving the user's keyword information, the web server 102 judges whether an URL (IP address) corresponding to the keyword exists with reference to the mapping table. When such a URL exists, the web server 102 transmits URL information corresponding to the keyword to the user client 100 and allows the user client to access the node corresponding to the corresponding URL.

That is, when the URL corresponding to the keyword input by the user exists, the web server 102 serves to redirect the user client 100 to the URL corresponding to the keyword.

However, when the URL corresponding to the keyword does not exist, the web server 102 extracts the search result corresponding to the keyword from the database 106 and transmits the extracted search result to the user client 100.

The search server 104 collects all information on a variety of keywords and stores the collected information in the database 106. When the keyword information is not a Korean domain, the web server 102 extracts the search result on the keyword from the database 106 and provides the extracted search result to the user client 100.

On the other hand, when the user sets an automatic keyword completion function, the access application transmits the keyword input by the user to the web server 102 in the unit of syllable.

Here, the unit of syllable means a unit of a syllable including consonants and vowels.

The database 106 stores recommended keyword information including the syllable information of a variety of keywords. The web server 102 judges whether a recommended keyword including the syllable information exists. When the recommended keyword exists, the web server 102 extracts and transmits the recommended keyword to the user client 100. The recommended keyword information can be output to a predetermined area of the web browser or to an area below the second address bar.

However, when the user does not set the automatic keyword completion function, a history of the information previously input to the second address bar by the user can be output in a drop-down manner.

On the other hand, the history may be always output depending on the user's setting. Alternatively, the history may be output when three English letters are input or the recommended keyword for automatic completion may be output when Korean consonants and vowels are input.

As described above, the access application provided from the web server 102 allows all the information for access to information to be input to only one address bar, analyzes patterns of the information input by the user, and provides file search results in the user client.

The access application can redirect the user client to the node corresponding to the keyword input by the user or receive the search result in cooperation of the web server 102, thereby providing the user with convenience.

Figure 2:
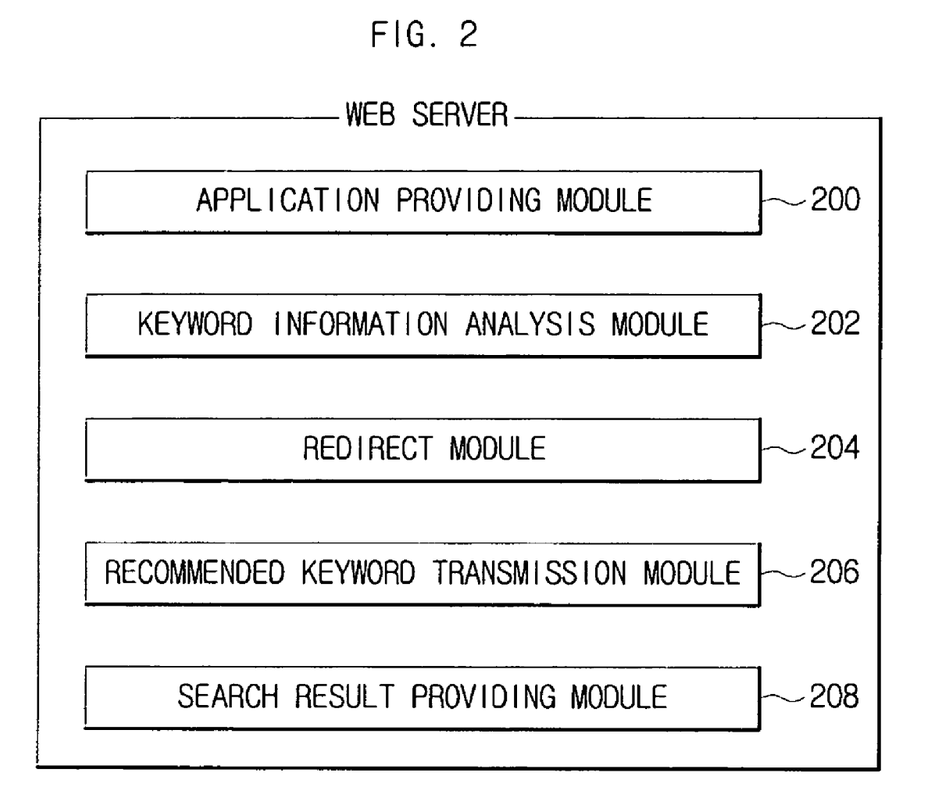
FIG. 2 is a diagram illustrating a module configuration of a web server according to an exemplary embodiment of the invention.

FIG. 2 is a diagram illustrating a module configuration of the web server according to an embodiment of the invention.

As shown in FIG. 2, the web server includes an application providing module 200, a keyword information analysis module 202, a redirect module 204, a recommended keyword transmission module 206, and a search result providing module 208.

The application providing module 200 provides the access application to the user client 100 when the user requests for download of the access application. The access application may be provided by a particular application providing server instead of the web server.

The web server 102 can further receive setting information indicating whether the address bar should be replaced on the user's download request. When the user requests for replacing the address bar, the web server 102 may provide the access application together with the module for replacing the address bar to the user client or may replace the address bar regardless of the user' request.

The keyword information analysis module 202 judges whether a URL corresponding to the received keyword exists with reference to the mapping table, when receiving the keyword information from the user client 100.

When the URL corresponding to the keyword exists in the mapping table, the redirect module 204 transmits the URL corresponding to the keyword to the user client 100 and allows the client computer 100 to directly access the node having the URL.

On the other hand, when the user sets the automatic keyword completion function, the web server 102 receives the keyword input by the user in the unit of syllable and the recommended keyword transmission module 206 extracts and transmits a recommended keyword including the syllable information to the user client 100.

In this way, the user can automatically complete the desired keyword.

When the keyword information analysis module 202 judges that the URL corresponding to the keyword does not exist, the search result providing module 208 extracts the search result corresponding to the keyword from the database 106 and provides the extracted search result to the user.

On the other hand, the user can designate a search domain of the keyword input by the user by the use of the access application. The search domain designating information can be included in a query transmitted from the user client. When the web server 102 receives the search domain designating information, the keyword information analyzing process can be omitted. When receiving the keyword information, the search result providing module 208 can provide the user client 100 with the search result corresponding to the received keyword and the designated search domain with reference to the database 106.

Figure 3:
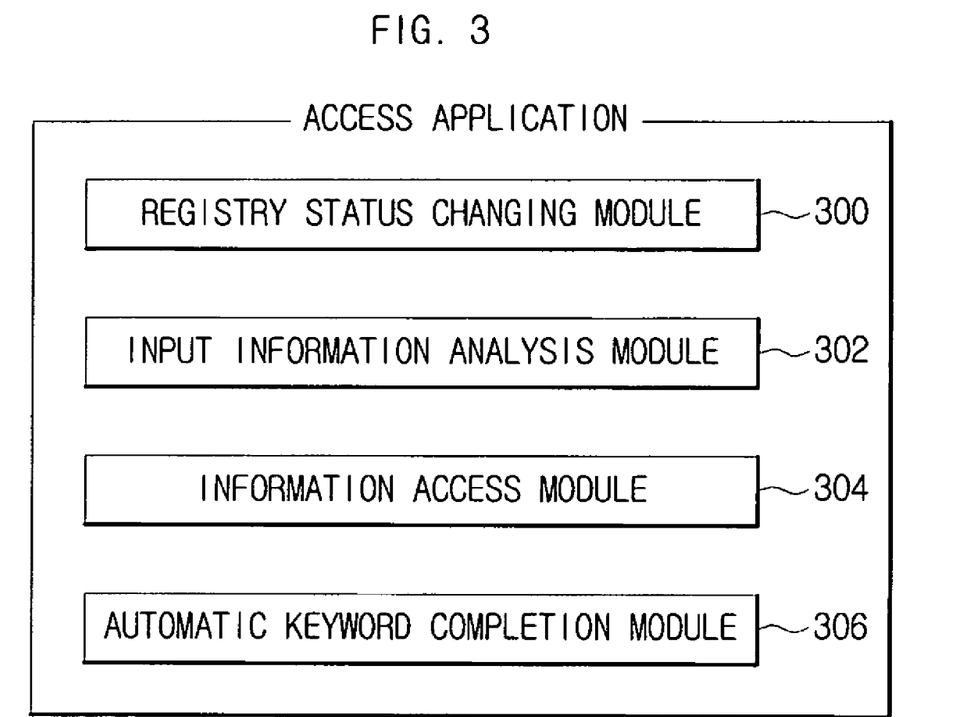
FIG. 3 is a diagram illustrating a module configuration of an access application according to an exemplary embodiment of the invention.

The web server interlocks with the access application installed in the user client 100. FIG. 3 is a diagram illustrating a module configuration of the access application according to an embodiment of the invention.

As shown in FIG. 3, the access application according to an embodiment of the invention includes a registry status changing module 300, an input information analysis module 302, an information access module 304, and an automatic keyword completion module 306.

The registry status changing module 300 changes a view-address status value of the first address bar in the registry of the web browser, when the access application is downloaded and installed from the web server 102.

Figure 7:
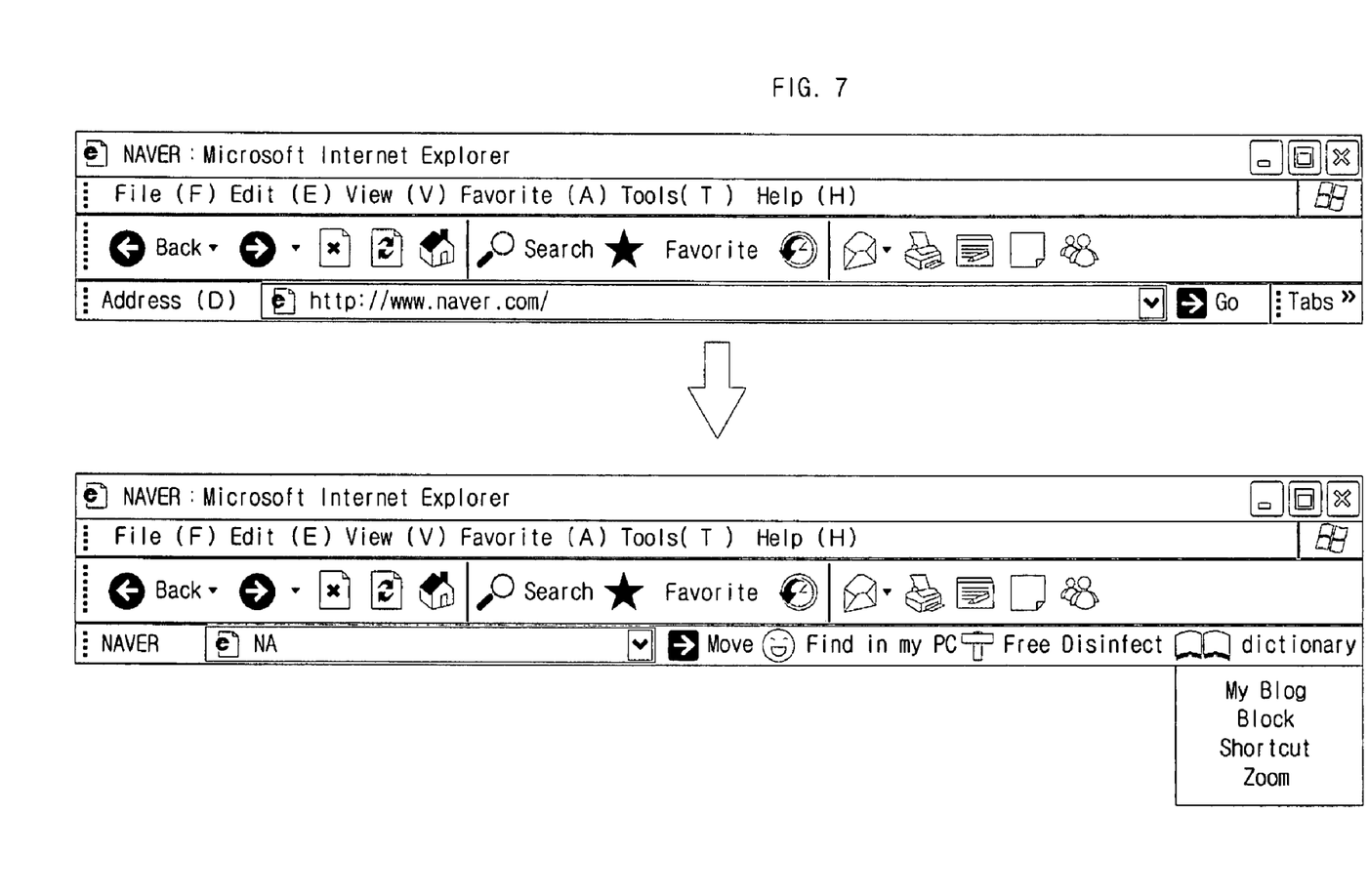
FIG. 7 is a diagram illustrating a process of replacing an address bar according to an exemplary embodiment.

As shown in FIG. 7, the existing first address bar disappears by the changing of the view-address status value and the first address bar is replaced with the second address bar according to the embodiment of the invention.

The input information analysis module 302 analyzing patterns of the information input to the second address bar by the user.

As described above, the information which can be input to the second address bar can include a variety of information such as a URL, an IP address, a Java script, a file path, and a keyword. The input information analysis module 302 judges which type of information is input by the user.

According to an embodiment of the invention, when it is judged as the result of the input information analysis that the information input by the user is the URL or IP address, the information access module 304 accesses a node corresponding to the URL or IP address. When the input information is the file path, the information access module 304 searches the files stored in the user client 100 and outputs the searched files.

According to another embodiment of the invention, the information access module 304 does not access the node directly and provides the URL or IP address information to the web browser so as to allow the web browser to access the node corresponding to the URL or IP address.

On the other hand, when the input information is the keyword, the information access module 304 transmits the keyword information to the web server 102. When the user sets the automatic keyword completion function, the information access module 304 transmits the syllable information to the web server 102 in the order of syllables input by the user.

Figure 8:
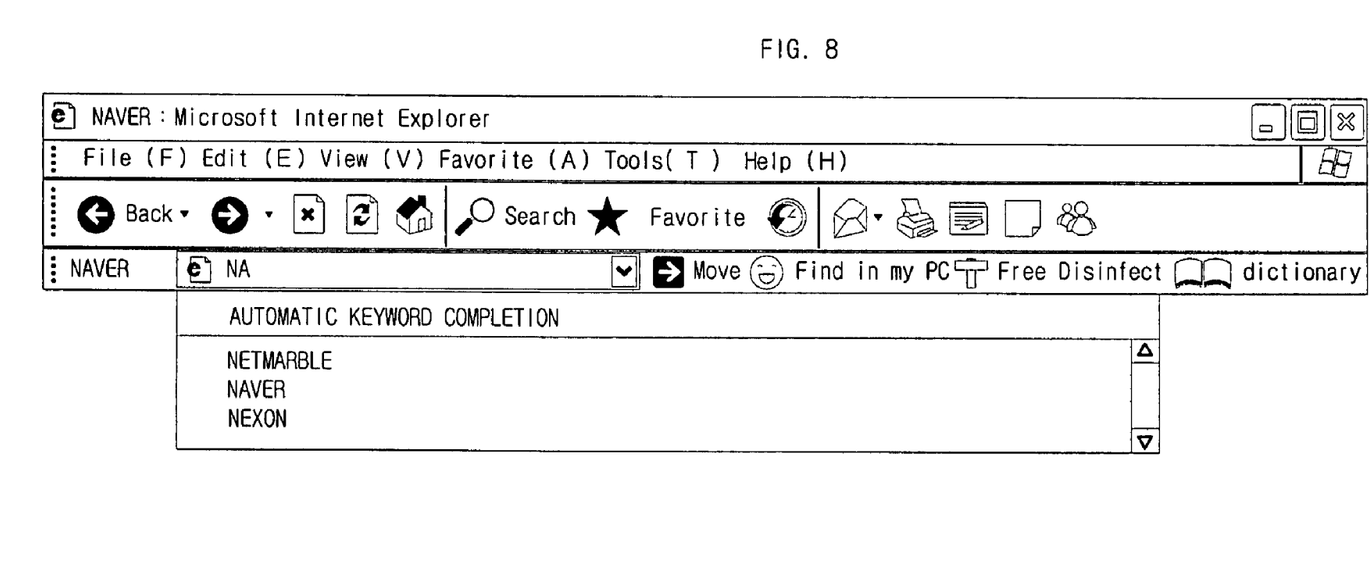
FIG. 8 is a picture for an automatic keyword completion process according to an exemplary embodiment of the invention.

The web server 102 extracts the recommended keyword corresponding to the received syllable information and transmits the recommended keyword to the user client 100. The automatic keyword completion module 306 outputs the recommended keyword to an area below the second address bar and receives the recommended keyword information selected by the user, as shown in FIG. 8.

According to an embodiment of the invention, the information access module 304 transmits the keyword information input or selected by the user to the web server 102 and receives and outputs the search result corresponding to the keyword from the web server 102.

According to another embodiment of the invention, the information access module 304 generates query information corresponding to the selected or input keyword and provides the generated query information to the web browser. The web browser transmits the query information (including the keyword information input or selected by the user) received from the information access module 304 to the web server 102 and receives and outputs the search result corresponding to the keyword from the web server 102.

When the user requires the search result for a specific keyword, the user can designate a search domain by the use of an interface 700 shown in FIG. 7. As described above, the web server 102 provides the search result corresponding to the search domain, when receiving the user's search domain designating information.

Figure 4:
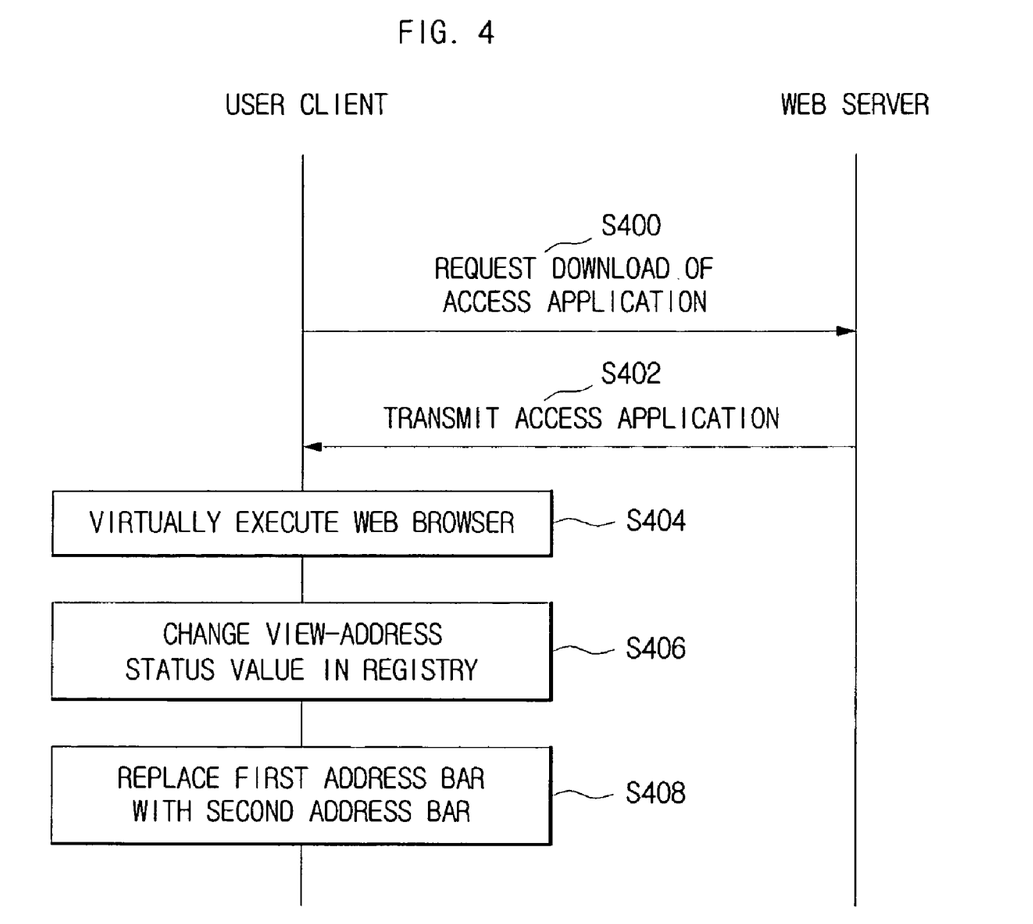
FIG. 4 is a flowchart illustrating a process of installing an access application according to an exemplary embodiment of the invention.

FIG. 4 is a diagram illustrating a process of installing the access application according to an embodiment of the invention. Referring to FIG. 4, the user client 100 requests the web server 102 for downloading the access application (S400) and the web server 102 transmits the access application to the user client 100 (S402).

When the access application is installed in the user client 100, the web browser is virtually performed (S404) and the view-address status value in the registry of the web browser is changed (S406).

As described above, when the view-address status value is changed, the first address bar in the web browser is replaced with the second address bar according to an embodiment of the invention as shown in FIG. 7 (S408).

Figure 5:
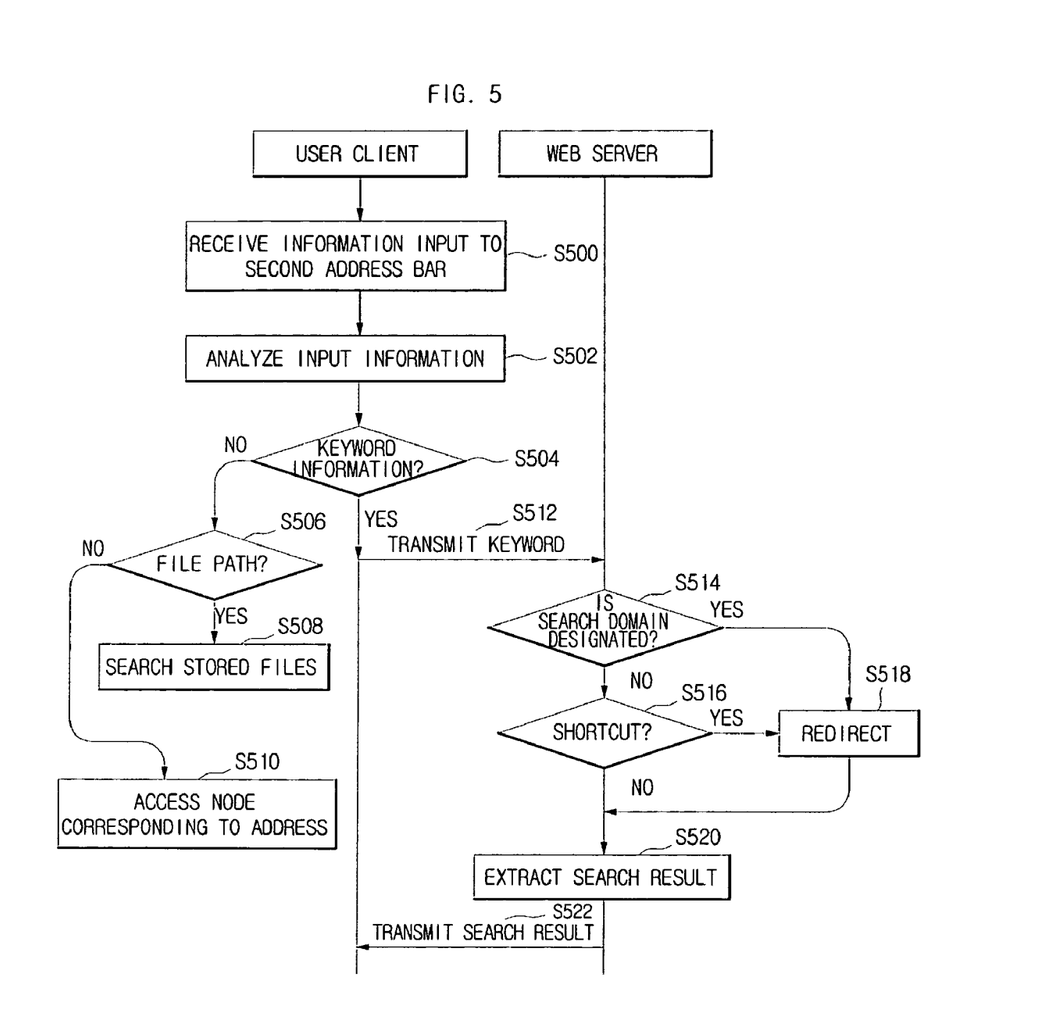
FIG. 5 is a flowchart illustrating a process of supporting access to information according to an exemplary embodiment of the invention.

FIG. 5 is a flowchart illustrating a process of supporting access to information according to an embodiment of the invention.

Referring to FIG. 5, the access application receives information input to the second address bar by the user (S500) and analyzes the received information (S502).

Specifically saying the process of analyzing the input information, the access application judges whether the input information is keyword information (S504). When the input information a keyword, the access application transmits the keyword information to the web server 102 or generates and provides the query information corresponding to the input keyword to the web browser. The web browser transmits the query information to the web server 102 (S512).

The user can designate the search domain of the keyword input to the second address bar. The web server 102 judges whether the search domain designating information is transmitted from the user client 100 (S514). When the search domain designating information is not transmitted, the web server 102 judges whether a shortcut corresponding to the keyword should be performed (S516).

Here, the judgment of the shortcut corresponds to a process of judging whether the URL corresponding to the keyword exists with reference to the mapping table. When the URL exists, the user client 100 is redirected (S518).

However, when the URL does not exist and when it is judged in S514 that the search domain is designated, the search result corresponding to the keyword is extracted from the database (S520) and the extracted search result is transmitted to the user client (S522).

On the other hand, when it is judged in S504 that the input information is not the keyword information, the access application judges whether the input information is the file path (S506). When the input information is the file path, the access application searches the files stored in the user client 100 and executes an application associated with the corresponding file to output the corresponding file (S508).

When the input information is not the file path, the input information may be the URL or IP address. Accordingly, the access application directly accesses the node corresponding to the URL or IP address or provides the URL or IP address to the web browser so as to access the node corresponding to the URL or IP address (S510).

For the purpose of convenient explanation, it has been described that the access application sequentially judges whether the input information is the keyword, the file path, or the URL or IP address. However, it should be understood by those skilled in the art that this is only an example and the process may be performed depending on the type resulting from the analysis of the input information.

Figure 6:
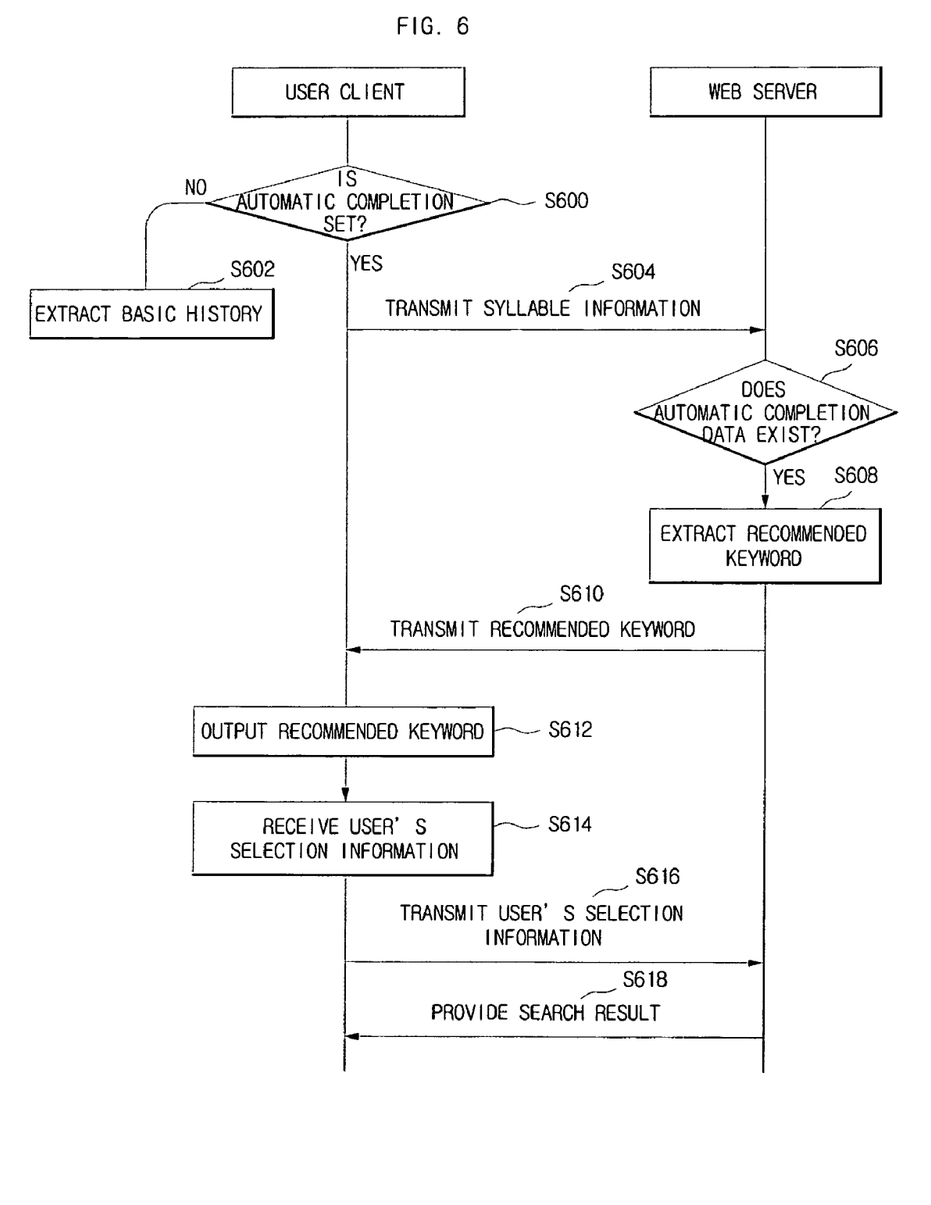
FIG. 6 is a flowchart illustrating a process of displaying an automatic completion function according to an exemplary embodiment of the invention.

FIG. 6 is a flowchart illustrating an automatic keyword completion process according to an embodiment of the invention. Referring to FIG. 6, when the user inputs a keyword, the access application judges whether the user sets the automatic keyword completion function (S600). When the user does not set the automatic keyword completion function, the access application outputs basic history information having been input to the second address bar by the user (S602).

On the other hand, when the user sets the automatic keyword completion function, the access application transmits the syllable information to the web server 102 in the order input by the user (S604).

The web server 102 judges whether automatically completed data (recommended keyword information) including the syllable information exists (S606). When the automatically completed data exists, the web server 102 extracts a recommended keyword including the syllable information (S608) and transmits the recommended keyword to the user client 100 (S610).

The access application outputs the recommended keyword to a predetermined area of the second address bar (S612) as shown in FIG. 8 and receives the user's selection information on one or more recommended keywords (S614).

The access application transmits the user's selection information to the web server 102 (S616). The web server 102 performs S514 to S520 shown in FIG. 5 and provides the search result to the user client 100 (S618).

Figure 9:
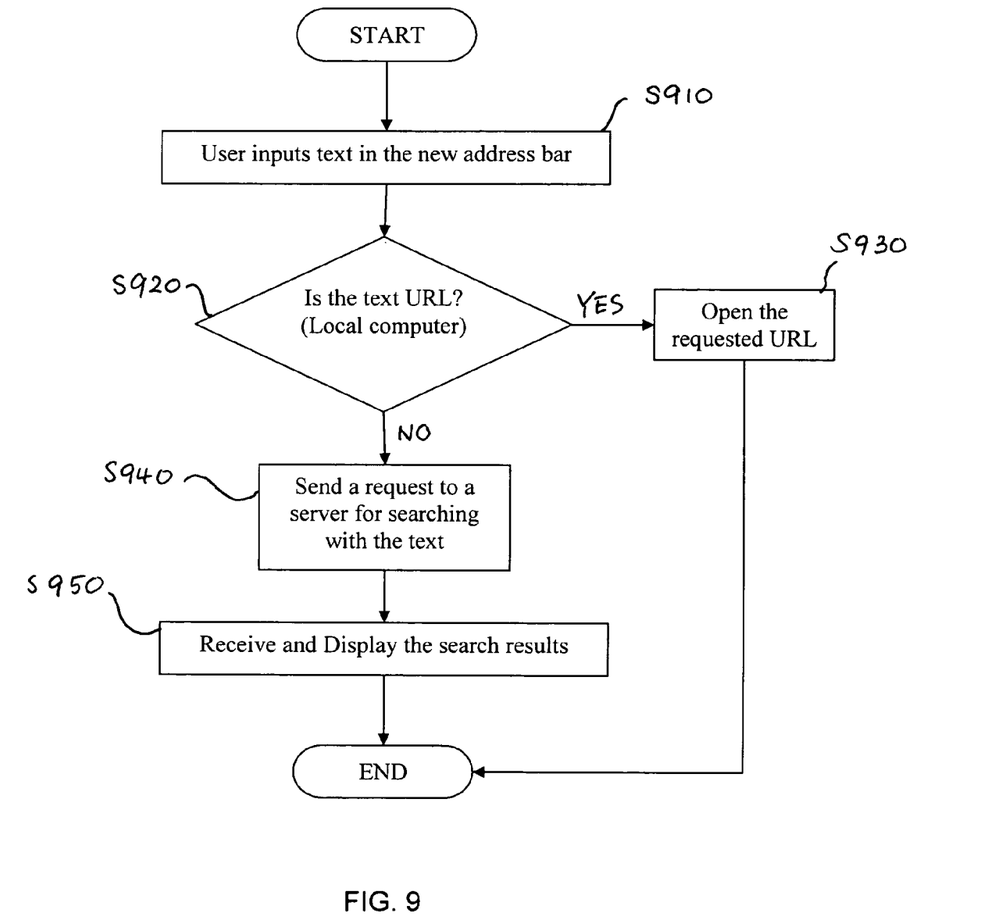
FIG. 9 is a flowchart illustrating an embodiment of the invention.

FIG. 9 is a flowchart illustrating another embodiment of the invention. The process starts with a web browser with an address bar to type any text or URL in. The address bar may be originally part of the web browser. Alternatively, the address bar may be installed to replace the original address bar.

In step S910, the user inputs text in the address bar and initiate processing. Then, the software associated with the address bar of the local computer determines if the inputted text is a URL or not (S920). If the text is a URL, then the local computer opens the requested URL (S930), i.e. opening the web site of the requested URL. If the text is not a URL, then the local computer sends the inputted text to a designated server with a request for a search with the text as a keyword (S940). Alternatively, in another embodiment, the local computer begins searching for documents, electronic files, etc. stored in a memory or data storage device of the local computer. The search results from the server or the local computer are displayed on a display associated with the local computer (S950).

According to embodiments of the invention, the software associated with the address bar determines whether the inputted text is a URL or not. Thus, in case the inputted text is determined to be a URL, the web browser does not need to connect to the server, and thus, does not need processing by the server. Further, because the software associated with the address bar it is impossible that where the search has to be done. For example, the user can configure the software such that the search is conducted in the local computer or a specific server connected to the local computer over a network.

The above-described method of supporting access to information according to an embodiment of the invention allows the user to access all the types of information like access to a web site, keyword search, and file search, by using one second address bar.

The exemplary embodiments of the invention are described as examples and it will be understood by those skilled in the art that a variety of modifications, changes, and additions may be made therein without departing from the spirit and scope of the invention and such modifications, changes, and additions belongs to the following claims.

According to the embodiments of the invention described above, it is possible to allow a user to access a web site, confirm a search result, and search for a file by using an address bar.

According to the embodiments of the invention, it is possible to allow a user to easily input a desired keyword by supporting an automatic keyword completion function when a keyword is input to an address bar.

According to the embodiments of the invention, it is possible to give convenience to a user by allowing the user to access all the types of information using an address bar.

According to the embodiments of the invention, it is possible to efficiently provide a search result by allowing a user to designate a search domain of a keyword input to an address bar.

What is claimed is:

1. A method of supporting access to information in a system connected to a user client through a network, the method comprising:
  (a) receiving at a server an access application download request from the user client;
  (b) transmitting via the server the requested access application to the user client, the access application serving to replace a first address bar existing in a web browser installed in the user client with a second address bar, wherein the access application, when hosted on the user client, is configured to analyze information input by the user into the second address bar to determine which of a plurality of types the information is, wherein the plurality of types of information includes at least URL, keyword, file path, where:
    if the information input into the second address bar corresponds to a URL, the access application hosted on the user client allows the user client to access a node having the corresponding URL,
    if the information input into the second address bar corresponds to a file path name, the access application hosted on the user client searches for and outputs a file corresponding to the file path name from the user client, and
    if the information input into the second address bar corresponds to a keyword, the access application hosted on the user client transmits the keyword to the sever;
  (c) receiving at the server keyword information among information input to the second address bar by a user, the keyword information being text information not directly including access information; and
  (d) transmitting via the server at least one of address information corresponding to the keyword information and search result information on the keyword information to the user client.

2. The method according to claim 1, wherein the access application changes a view-address status value in a registry of the web browser when the access application is installed in the user client.

3. The method according to claim 1, wherein when information input to the second address bar by the user is a file path, the access application hosted on the user client identifies a corresponding file on the user client.

4. The method according to claim 1, further comprising:
  receiving syllable information on the keyword information input by the user; and
  extracting recommended keyword information including the syllable information and transmitting the recommended keyword information to the user client.

5. The method according to claim 4, wherein the access application outputs a previous input information history of the user to the second address bar when an automatic keyword completion function is not enabled.

6. The method according to claim 1, further comprising determining whether an IP address corresponding to the keyword information exists with reference to a keyword mapping table storing an URL corresponding to the keyword, wherein in (d), a search result corresponding to the keyword information is extracted and provided when the IP address does not exist.

7. The method according to claim 1, further comprising determining whether an IP address corresponding to the keyword information exists with reference to a keyword mapping table storing a URL corresponding to the keyword, wherein in (d), the user client is redirected to the IP address when the IP address does not exist.

8. The method according to claim 1, wherein when search domain designating information on the keyword is received from the user client, a search result corresponding to the search domain is provided in (d).

9. The method according to claim 1, wherein the access application is further configured to analyze information input by the user into the second address bar and determine whether the information corresponds to a Java script.

10. A recording medium in which a program of commands to be executed by a digital processor is materially embodied so as to support access to information and which is readable by the digital processor, the recording medium including a program performing:
   (a) changing a view-address status value of a web browser in a registry and replacing a first address bar of the web browser with a second address bar when the program is installed in a user client;
   (b) analyzing information input to the second address bar, wherein the access program, when hosted on the user client, is configured to analyze information input into the second address bar to determine which of a plurality of types the information is, wherein the plurality of types of information includes at least URL, keyword, file path, where:
       if the information input into the second address bar corresponds to a URL, the access program is configured to allow the user client to access a node having the corresponding URL,
       if the information input into the second address bar corresponds to a file path name, the access program is configured to search for and output a file corresponding to the file path name, and
       if the information input into the second address bar corresponds to a keyword, the access program is configured to transmit the keyword to at least one sever;
   (c) transmitting keyword information among the input information to a web server; and
   (d) receiving an IP address corresponding to the keyword information and/or search result information corresponding to the keyword information from the web server.

11. The recording medium according to claim 10, wherein when the program, when hosted on the user client, determines the information input to the second address bar by the user is a file path, the program identifies a corresponding file on the user client.

12. The recording medium according to claim 10, wherein the program is configured to determine:
   transmitting syllable information on the keyword information input by the user to the web server; and
   receiving recommended keyword information including the syllable information from the web server and outputting the recommended keyword information.

13. The recording medium according to claim 12, wherein a previous input information history of the user to the second address bar is output when an automatic keyword completion function is not enabled.

14. The recording medium according to claim 10, wherein the program further performs outputting an interface for designating a search domain of a keyword, and wherein a search result corresponding to the search domain designating information is received and output from the web server.

15. The method according to claim 10, wherein the program is further configured to analyze information input into the second address bar and determine whether the information corresponds to a Java script.

16. A recording medium in which a program of commands to be executed by a digital processor is materially embodied so as to support access to information and which is readable by the digital processor, wherein the program is configured to perform the acts of:
   (a) changing a view-address status value of a web browser in a registry and replacing a first address bar of the web browser with a second address bar when the program is installed in a user client;
   (b) analyzing information input to the second address bar, wherein the program, when hosted on the user client, is configured to analyze information input into the second address bar to determine which of a plurality of types the information is, wherein the plurality of types of information includes at least URL, keyword, file path, where:
       if the information input into the second address bar corresponds to a URL, the program is configured to allow the user client to access a node having the corresponding URL,
       if the information input into the second address bar corresponds to a file path name, the program is configured to search for and output a file corresponding to the file path name, and
       if the information input into the second address bar corresponds to a keyword, the program is configured to transmit keyword information; and
   (c) providing query information corresponding to a keyword to a web browser when the input information is the keyword,
   wherein the web browser receives and outputs at least one of an IP address corresponding to the query information and search result information corresponding to the query information.

17. The recording medium according to claim 16, wherein when the program determines information input to the second address bar by the user is a file path, the program identifies a corresponding file on the user client.

18. The recording medium according to claim 16, wherein the program is configured to perform the acts of:
   transmitting syllable information on the keyword information input by the user to the web server; and
   receiving recommended keyword information including the syllable information from the web server and outputting the recommended keyword information.

19. The recording medium according to claim 18, wherein a previous input information history of the user to the second address bar is output when an automatic keyword completion function is not enabled.

20. The recording medium according to claim 16, wherein the program further performs outputting an interface for designating a search domain of a keyword, and wherein the query information in which the search domain is designated is generated and provided to the web browser.

21. The method according to claim 16, wherein the program is further configured to analyze information input into the second address bar and determine whether the information corresponds to a Java script.

22. A system for supporting access to information, the system comprising:
   a web server which is connected to a user client through a network, which is configured to receive an access application download request from the user client, transmit the requested access application to the user client, the access application serving to replace a first address bar existing in a web browser installed in the user client with a second address bar, wherein the access application, when hosted on the user client, is configured to analyze information input into the second address bar to determine which of a plurality of types the information is, wherein the plurality of types of information includes at least URL, keyword, file path, where:

if the information input into the second address bar corresponds to a URL, the access application is configured to allow the user client to access a node having the corresponding URL, if the information input into the second address bar corresponds to a file path name, the access application is configured to search for and output a file corresponding to the file path name, and if the information input into the second address bar corresponds to a keyword, the access application is configured to transmit at least one of address information corresponding to the keyword information and search result information on the keyword information to the user client;

a search server configured to collect search information on a keyword; and a database storing a keyword mapping table for redirecting the user client to the IP address and search result information corresponding to the keyword.

23. The system according to claim 22, wherein the web server includes:

an access application providing module providing the access application;

a keyword information analysis module providing the access application;

a redirect module redirecting the user client when the keyword exists in the keyword mapping table; and a search result providing module providing the search result corresponding to the keyword when the keyword does not exist in the keyword mapping table.

24. A recording medium in which a program of commands to be executed by a digital processor is materially embodied so as to support access to information and which is readable by the digital processor, wherein the program is configured to perform the acts of:

(a) changing a set value of a web browser hosted on a user client to replace a first address bar of the web browser with a second address bar; and (b) at the user client, analyzing information input to the second address bar to determine which of a plurality of types the information is, wherein the plurality of types of information includes at least URL, keyword, and file path, and to allow the user client to access a node having a corresponding URL when the information corresponds to a URL, transmit keyword information when the information corresponds to a keyword, and search for and output a file corresponding to the file path name from the user client when the information corresponds to a file path, wherein the web browser receives access information corresponding to the analyzed input information.

25. The recording medium according to claim 24, wherein a registry of the web browser is changed in (a).

26. The recording medium according to claim 24, wherein when the program determines the information input to the second address bar by the user is a file path, the program identifies a corresponding file.

27. The recording medium according to claim 24, wherein the access information includes at least one of redirect information, search result information provided from an external server, and internal search result information of the user client.

28. The recording medium according to claim 24, wherein the program further performs:

transmitting keyword information including text among the input information to a web server; and receiving at least one of an IP address corresponding to the keyword information and search result information corresponding to the keyword information from the web server.

29. The recording medium according to claim 24, wherein the program is configured to analyze information input into the second address bar and determine whether the information corresponds to a Java script.

30. A program in which commands to be executed by a digital processor is materially embodied so as to support access to information, the program configured to perform:

(a) changing a set value of a web browser to replace a first address bar of the web browser with a second address bar; and (b) analyzing information input to the second address bar to determine how the information is to be processed, wherein the program is configured to be hosted on a user client and to distinguish between at least a URL, a keyword, and a file path;

allowing the user client to access a node having the corresponding URL when the information corresponds to a URL;

transmitting keyword information when the information corresponds to a keyword;

searching for and outputting a file corresponding to the file path name from the user client when the information corresponds to a file path, wherein the web browser receives access information corresponding to the analyzed input information.

* * * * *